United States Patent [19]

Penteker

[11] Patent Number: 5,778,852
[45] Date of Patent: Jul. 14, 1998

[54] FUNCTIONALLY MONITORED FUEL INJECTION SYSTEM

[75] Inventor: Martin Penteker, Tiefenbronn, Germany

[73] Assignee: Mercedes-Benz AG, Germany

[21] Appl. No.: 845,793

[22] Filed: Apr. 25, 1997

[30] Foreign Application Priority Data

Apr. 26, 1996 [DE] Germany .......... 196 16 773.6

[51] Int. Cl.$^6$ .......... F02D 31/00; F02M 37/04
[52] U.S. Cl. .......... 123/359; 123/501; 123/494
[58] Field of Search .......... 123/500, 501, 123/359, 446, 494

[56] References Cited

U.S. PATENT DOCUMENTS

| | | | |
|---|---|---|---|
| 4,573,347 | 3/1986 | Sekiguchi et al. | 123/494 |
| 4,669,440 | 6/1987 | Takase et al. | 123/494 |
| 4,730,586 | 3/1988 | Yamaguchi et al. | 123/357 |
| 4,844,035 | 7/1989 | Takagi | 123/446 |
| 5,105,788 | 4/1992 | Engel | 123/501 |
| 5,261,374 | 11/1993 | Gronenberg et al. | 123/501 |
| 5,462,032 | 10/1995 | Nakamura | 123/501 |

FOREIGN PATENT DOCUMENTS

| | | |
|---|---|---|
| 227058A2 | 7/1987 | European Pat. Off. . |
| 308392 | 3/1989 | European Pat. Off. . |
| 33 11 351A1 | 10/1984 | Germany . |
| 40 31 368A1 | 4/1992 | Germany . |
| 40 33 049A1 | 4/1992 | Germany . |
| 2 176 633 | 12/1986 | United Kingdom . |
| WO 95/07409 | 3/1995 | WIPO . |

Primary Examiner—Thomas N. Moulis
Attorney, Agent, or Firm—Evenson, McKeown, Edwards & Lenahan, P.L.L.C.

[57] ABSTRACT

The invention relates to a fuel injection system having an electrically actuatable injection pump which comprises a pre-stroke actuator for setting the start of injection and a flow rate actuator for setting the injection quantity. A control unit for controlling the injection quantity and start of injection emits an actuation signal which starts injection to the flow rate actuator, and an actuation signal for the start of injection to the pre-stroke actuator via an output lead for the actuation signal for the start of injection. According to the invention, the control unit protects the pre-stroke actuator against a short-circuit on the output lead by monitoring the control deviation at the start of injection between the actual value for the start of injection (detected by means of a needle movement sensor) and a desired value for the start of injection, which fixed as a function of the engine operating point. The unit takes protective measures if the control deviation at the start of injection is greater than a prescribable warning threshold value for longer than a prescribable time period.

11 Claims, 2 Drawing Sheets

FUNCTIONALLY MONITORED FUEL INJECTION SYSTEM

This application claims the priority of German priority document 196 16 773.6, the disclosure of which is expressly incorporated by reference herein.

BACKGROUND AND SUMMARY OF THE INVENTION

The invention relates to an electronically controlled fuel injection system for an internal combustion engine.

Fuel injection systems of the generic type are known for example in the form of the in-line injection pump, marketed by Bosch under the type designation RP 43, with associated type MS5 control unit, for use in utility vehicles having a diesel engine with electronically controlled fuel injection.

Fuel injection systems with functional monitoring of the injection quantity controller have been proposed in various forms. For example, U.S. Pat. No. 4,730,586 describes an injection system in which the control difference of the injection quantity controller is ascertained and monitored by an error detection unit to determine whether it is above a prescribed limit value for longer than a predetermined time period. Whenever this is so, an appropriate warning signal is given.

German patent document DE 40 33 049 A1 discloses a method for checking the sensor for the position of the volume-flow actuator in an internal combustion engine. When a defect is detected in the sensor for the position, of the volume-flow actuator, a check is made (with the volume-flow actuator then deactivated) whether a needle movement sensor, a feed start sensor, and/or a combustion start sensor supply an unambiguous output signal. If so, a malfunction is detected and the injection is interrupted by means of a flow deactivation switch.

German patent document DE 33 11 351 A1 also describes a functional monitoring arrangement for an injection quantity controller, which is designed in particular to detect a failure of a control travel sensor. A functional monitoring arrangement for the. injection quantity control circuit is also disclosed in the case of a fuel injection system which is specified in European patent document EP 0 308 392 A1.

European patent document EP 0 227 058 A2 discloses an injection start controller in a distributor pump for a diesel engine, which is designed in particular to detect the failure of a needle movement sensor (which is provided, together with an engine speed sensor, for ascertaining the actual value of the start of injection). The control deviation at the start of injection is fed to an emergency switch-over unit which normally passes it on to a downstream PI controller. However, if a malfunction (in particular a failure of the needle movement sensor) is detected, the control deviation signal is fed to a correction characteristic diagram unit to set emergency operation.

One object of the invention is to provide a fuel injection system of the type mentioned above which reliably monitors and protects the pre-stroke actuator, with regard in particular to the occurrence of a short-circuit on the line for the actuation signal for the start of injection.

To achieve this object, in the fuel injection system according to the invention, the control unit which actuates the injection pump monitors a control deviation between the actual start of injection (detected by a needle movement sensor) and a desired value for the start of injection, which is fixed as a function of the engine operating point. When the control deviation at the start of injection exceeds a predetermined warning threshold value for longer than a predetermined time period, the control unit protects the pre-stroke actuator against a short circuit in the lead for the actuation signal for the start of injection (leading from the control unit to the pre-stroke actuator), by emitting a corresponding warning signal, or by cancelling the effect on the pre-stroke actuator of the signal fed on this lead. This arrangement thus prevents damage to the pre-stroke actuator, which might otherwise be caused by an excessively long short circuit on its actuation lead. That is, such a short circuit causes the pre-stroke actuator to be actuated for the start of injection at times which are unfavorable or unacceptable for the associated engine. According to the invention, in the detected error situation, the control unit counteracts the effect of the short circuit signal on the pre-stroke mechanism by switching off the injection pump, thereby protecting the pre-stroke actuator against destruction. As a result, unnecessary costs for dismantling and installation of the injection pump can be avoided, and the downtime of the motor vehicle can be reduced.

One embodiment of the invention makes allowance for the fact that, in the event of a short circuit such as described above, the start of injection (which, as a result, has been incorrectly set at the pre-stroke actuator) is more than 20% ahead of the top dead center of the piston stroke of a reciprocating piston engine. This value deviates markedly from the normal fluctuations from the start of injection which are a function of the engine operating point. Thus, when this state lasts beyond the prescribed time period, the injection control unit can reliably conclude that there is a fault in the pre-stroke actuator control circuit, owing in particular to such a short circuit.

In another embodiment of the invention, the prescribable time period for which the start-of-injection control deviation may exceed the prescribed warning threshold value without a warning being issued or the system being deactivated, is fixed at approximately 10 minutes at maximum. This arrangement takes into account the fact that the pre-stroke actuator is usually destroyed if the short circuit is present for approximately 10 minutes or longer.

Other objects, advantages and novel features of the present invention will become apparent from the following detailed description of the invention when considered in conjunction with the accompanying drawings.

DETAILED DESCRIPTION OF THE DRAWINGS

Figure 1:
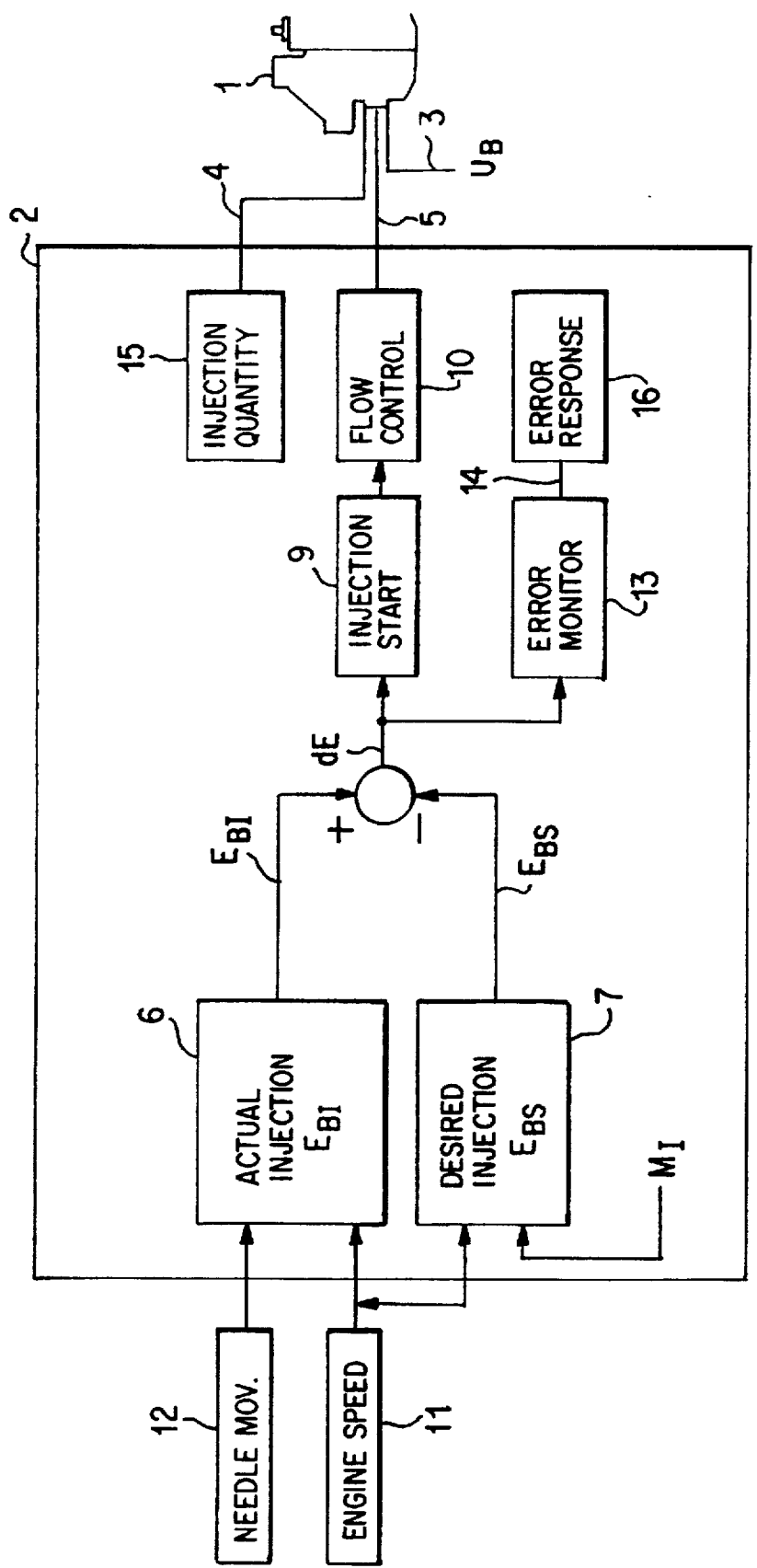
FIG. 1 shows a block diagram of a fuel injection system according to the invention for the electronically controlled injection of diesel fuel.

The fuel injection system shown in the figure includes an injection pump (1) (shown schematically in its electric connection area), and a control unit (2) (which may be, for example, an engine control unit) which actuates the injection pump (1) and, if appropriate, other vehicle components. The injection pump (1) is of the in-line injection type, and comprises a volume-flow actuator for setting the injection quantity of fuel, as well as a pre-stroke actuator for setting the start of fuel injection. The injection pump (1) is connected to a positive vehicle-mounted power system voltage ($U_B$) of the vehicle via a feedline (3). The volume-flow actuator of the injection pump (1) is actuated by an injection-quantity control device 15 (not shown in further detail), within the control unit (2), via a lead (4), for the actuation signal for the injection quantity.

In an analogous way, the pre-stroke actuator is actuated by a start-of-injection control device of the control unit (2) via a lead (5) for the actuation signal for the start of injection. This start-of-injection control device includes a unit (6) for determining the actual value ($E_{BI}$) of the start of injection, a characteristic diagram unit (7) for prescribing the desired value ($E_{BS}$) of the start of injection, a subtractor (8) for forming the control deviation ($dE=E_{BI}-E_{BS}$), a controller (9) for the start of injection and a flow controller (10) for the start of injection, which is connected downstream thereof and whose output signal forms the actuation signal for the pre-stroke actuator of the injection pump (1). In addition to the foregoing closed loop control, the control unit also includes further components which perform a dynamic open-loop control of the start of injection and a starting control of the start of injection in certain operating phases. The two output signals of these components, which are not of interest here and are therefore not illustrated, are fed, in parallel with the signal of the controller (9) for the start of injection, to the flow controller (10) for the start of injection.

In order to determine the actual value ($E_{BI}$) for the start of injection, the engine-speed information of an engine-speed sensor (11) and the output signal of a needle-movement sensor (12) are fed to the input side of the unit (6). The needle-movement sensor (12) determines the actual position of the pre-stroke actuator of the injection pump (1), indirectly with respect to a reference position. The position reference used here may be, for example in the case of a reciprocating piston engine, the top dead center which can be determined with the aid of the engine-speed sensor (11).

In order to prescribe the desired value ($E_{BS}$) for the start of injection, the characteristic diagram unit (7) uses the output signal of the engine-speed sensor (11) and the information relating to the actual value of the injection quantity ($M_I$).

If, during operation of the fuel injection system, a short-circuit to ground occurs on the lead (5) for the actuation signal for the start of injection, this failure forces the pre-stroke mechanism into a position which corresponds to a start of injection that is more than 20% ahead of the top dead center. If this state lasts for a relatively long time (for example approximately 10 minutes), there is a risk of irreparable damage to the pre-stroke actuator, and thus to the entire injection pump (1). In order to prevent this catastrophic failure, the control unit (2) includes an error monitoring unit (13) which can be implemented either as hardware or software. The error monitoring unit, which includes a timer, receives the control deviation (dE) for the start of injection as an input. As noted previously, in the case of a short-circuit on the lead (5), the actual value ($E_{BI}$) for the start of injection lies more than 20% ahead of the top dead center, while the desired value ($E_{BS}$) for the start of injection is very much closer to the top dead center. A short circuit on the lead (5) is consequently accompanied by a control deviation (dE) for the start of injection which persistently remains large.

The error-monitoring unit (13) detects this situation by continuously monitoring the control deviation (dE) for the start of injection, supplied by the subtractor (8), to determine whether it is greater than a prescribed threshold value for longer than a prescribed time period. If this occurs, it emits an error-detection signal via an output lead (14) to an error response unit (16), which activates a warning signal for the driver and, furthermore, triggers a deactivation of the output stage of the control unit (2) for the actuation of the injection pump. As a result, the operation of the fuel injection system is stopped. The length of the time period for this error detection is of course selected such that a short-circuit on the lead (5) during this time period has not yet led to irreparable damage to the pre-stroke actuator, and thus to the injection pump (1). Since the control deviation (dE) for the start of injection in this short-circuit situation is persistently significantly greater over the prescribed time period (which is for example in the order of magnitude of a number of minutes) than in normal brief control fluctuations, the short-circuit situation can be reliably detected by the error-monitoring unit (13).

Figure 2:
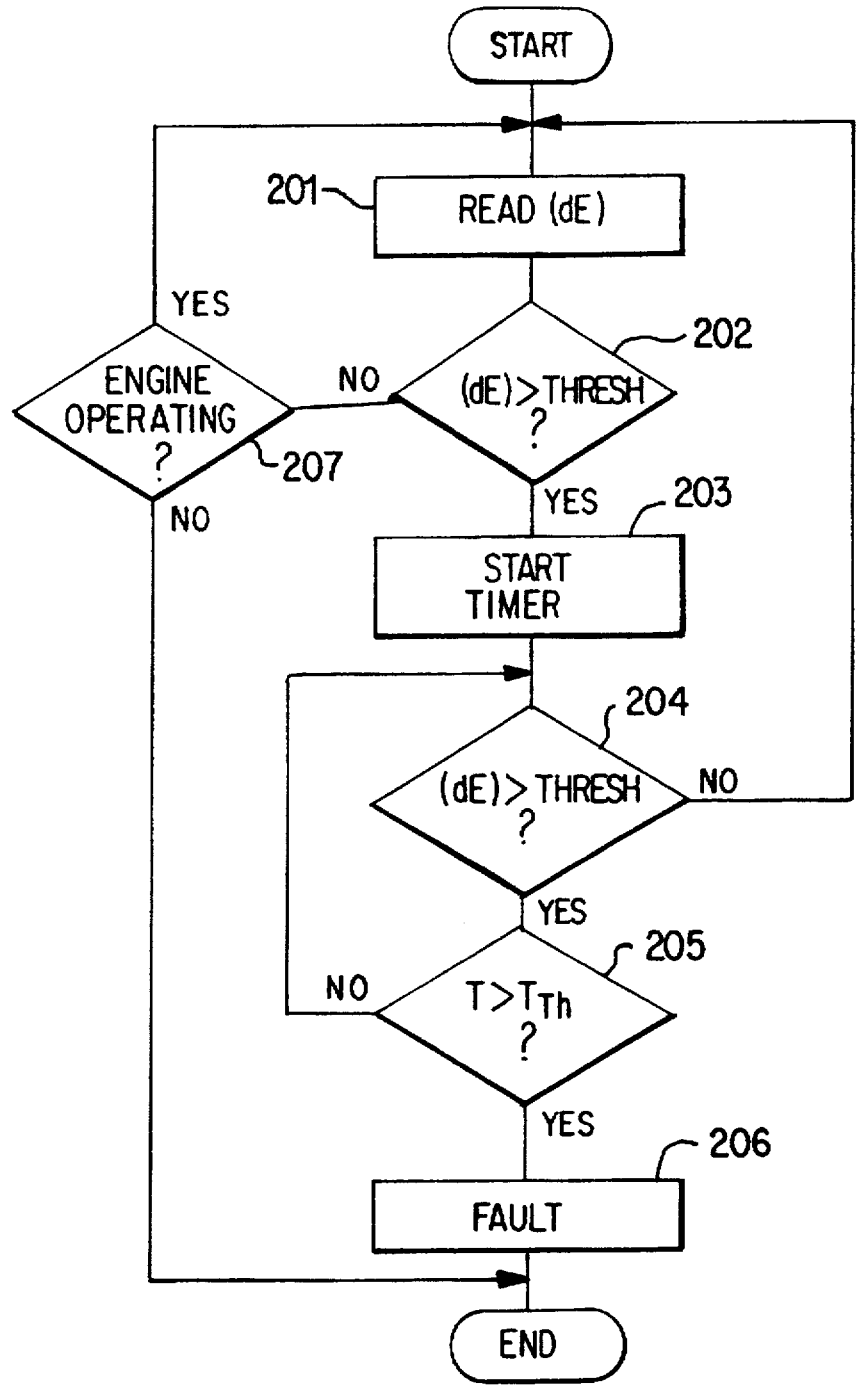
FIG. 2 is a flow chart which illustrates the operation of the error monitoring according the invention.

FIG. 2 is a flow chart which shows the monitoring process performed by the error monitoring unit (13) according to the invention. As shown in FIG. 2, the monitoring begins in step 201 in which the error monitoring unit reads the value of the control deviation dE output from the difference unit in FIG. 1. Next, in step 202, dE is compared with a predetermined threshold Thresh, and if dE > Thresh, the timer is started in step 203. The value (dE) is once again compared with Thresh in step 204, and if it remains greater than the threshold, a check is made in step 205 whether the time T generated by the timer has exceeded the preset time limit $T_{lim}$. If not, steps 204 and 205 are repeated until either (dE) falls below the threshold Thresh, or the excess continues beyond the time limit $T_{lim}$ in step 205. If the latter occurs, an error signal is generated in step 206, and the process ends. Of course, the process is also terminated in step 207, when the engine stops operating. Otherwise, steps 201 and 202 are repeated continuously to monitor the control deviation as described above.

Of course, other error states in the pre-actuator component of the fuel injection system are also detected if they result in such large start-of-injection control deviations which are persistently large over a specific time period. Furthermore, in addition to this inventive protection for the pre-stroke actuator against destruction, the flow-volume actuator, together with associated injection quantity control means, can be monitored for incorrect functions in one of the conventional ways mentioned at the beginning, and thus protected against damage.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Internal combustion engine fuel injection system having an electrically actuatable injection pump with a pre-stroke actuator for setting the start of injection and a control unit for controlling start of injection, which control unit emits an actuation signal for the start of injection to the pre-stroke actuator via an output lead, said fuel injection system further comprising:

a needle movement sensor for detecting an actual start of injection based on movement of a needle for controlling fuel flow in said fuel injection system;

a comparing device for comparing said actual start of injection with a desired start of injection, to generate a start-of-injection control deviation value; and means in said control unit for protecting the pre-stroke actuator against a short circuit on said output lead, by monitoring said start-of-injection control deviation, detecting when said start-of-injection control deviation exceeds a predeterminable warning threshold value for a time which is longer than a predeterminable time interval, and generating an error detection signal in response thereto.

2. Fuel injection system according to claim 1 further comprising means responsive to said error detection signal for implementing at least one of:

emitting a warning signal; and cancelling effectiveness of said actuation signal for the start of injection in said pre-stroke actuator.

3. Fuel injection system according to claim 1 wherein said desired start of injection is determined by means of a characteristic diagram stored in a desired injection generating unit, as a function of said engine operating point.

4. Fuel injection system according to claim 2 wherein said desired start of injection is determined by means of a characteristic diagram stored in a desired injection generating unit, as a function of said engine operating point.

5. Fuel injection system according to claim 1 wherein the control unit emits the warning signal or cancels the effectiveness of the actuation start signal if the actual start of injection is at least approximately 20% ahead of the top dead center of a respective piston stroke of a reciprocating piston engine for longer than the predeterminable time interval.

6. Fuel injection system according to claim 1 wherein the predeterminable time interval is approximately 10 minutes at a maximum.

7. Fuel injection system according to claim 2 wherein the predeterminable time interval is approximately 10 minutes at a maximum.

8. Method of controlling operation of an internal combustion engine fuel injection system having an electrically actuatable injection pump with a pre-stroke actuator for setting the start of injection and a control unit for controlling start of injection, which control unit emits an actuation signal for the start of injection to the pre-stroke actuator via an output lead, said method comprising the steps of:

detecting an actual start of fuel injection based on movement of a needle for controlling fuel flow in said fuel injection system;

comparing said actual start of injection with a desired start of injection, fixed as a function of an engine operating point of said engine, to generate a start-of-injection control deviation value;

monitoring said start-of-injection control deviation to detect an event wherein it exceeds a predeterminable warning threshold value for a time which is longer than a predeterminable time interval; and generating an error detection signal in response to detection of an event.

9. Method according to claim 8 further comprising at least one of the additional steps of:

emitting a warning signal; and cancelling effectiveness of said actuation signal for the start of injection in said pre-stroke actuator.

10. Method according to claim 8 wherein said desired start of injection is determined by means of a characteristic diagram stored in a desired injection generating unit, as a function of said engine operating point.

11. Method according to claim 9 wherein said desired start of injection is determined by means of a characteristic diagram stored in a desired injection generating unit, as a function of said engine operating point.

* * * * *